United States Patent
Sauer

[11] Patent Number: 6,134,912
[45] Date of Patent: Oct. 24, 2000

[54] METHOD AND SYSTEM FOR SEPARATION OF A MIXED GAS CONTAINING OXYGEN AND CHLORINE

[75] Inventor: Richard A. Sauer, Hinsdale, Ill.

[73] Assignee: Air Liquide America Corporation, Houston, Tex.

[21] Appl. No.: 09/238,027

[22] Filed: Jan. 27, 1999

[51] Int. Cl.[7] .................................................. F25J 1/00
[52] U.S. Cl. .............................................. 62/632; 62/921
[58] Field of Search ................................. 62/632, 921

[56] References Cited

U.S. PATENT DOCUMENTS

| | | | |
|---|---|---|---|
| 2,556,833 | 6/1951 | Wall, Jr. ..................................... 62/921 |
| 2,657,976 | 11/1953 | Rowe et al. . | |
| 3,501,922 | 3/1970 | Schmidt et al. ........................... 62/921 |
| 3,865,920 | 2/1975 | Dunn, Jr. . | |
| 4,094,954 | 6/1978 | Bonsack et al. . | |
| 4,389,391 | 6/1983 | Dunn, Jr. . | |
| 4,533,375 | 8/1985 | Erickson . | |
| 4,875,346 | 10/1989 | Jones et al. . | |
| 5,000,006 | 3/1991 | Itoh et al. ................................. 62/921 |
| 5,035,726 | 7/1991 | Chen et al. . | |
| 5,087,335 | 2/1992 | Kelham ..................................... 62/632 |
| 5,114,449 | 5/1992 | Agrawal et al. . | |
| 5,133,790 | 7/1992 | Bianchi et al. . | |
| 5,471,842 | 12/1995 | Mostello et al. . | |
| 5,592,832 | 1/1997 | Herron et al. . | |
| 5,655,388 | 8/1997 | Bonaquist et al. . | |

*Primary Examiner*—Ronald Capossela
*Attorney, Agent, or Firm*—Burns, Doane, Swecker & Mathis, L.L.P.

[57] ABSTRACT

Provided are novel methods and systems for separating a mixed gas containing oxygen and chlorine. According to one method in accordance with the invention, the mixed gas and a refrigerant are introduced into a separator unit. At least a portion of the chlorine is condensed from the mixed gas in the separator unit, thereby forming a condensed chlorine-rich liquid fraction and an oxygen-enriched gas fraction. The condensing duty is supplied by the refrigerant, which can be liquid oxygen. The mixed gas and refrigerant can be brought into direct or indirect contact with one another. The invention can be advantageously applied to the treatment of exhaust gases from an ore treatment plant, and can result in enriched oxygen and chlorine streams which may be recycled or used in other applications.

32 Claims, 3 Drawing Sheets

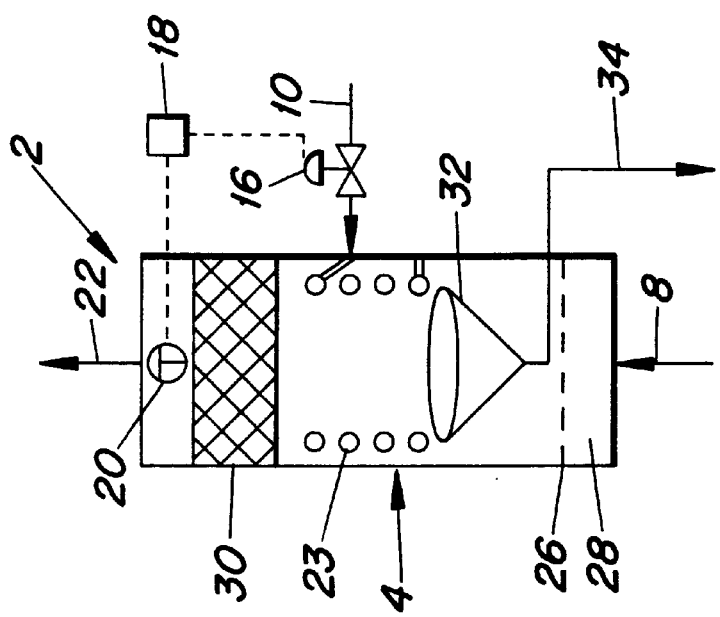
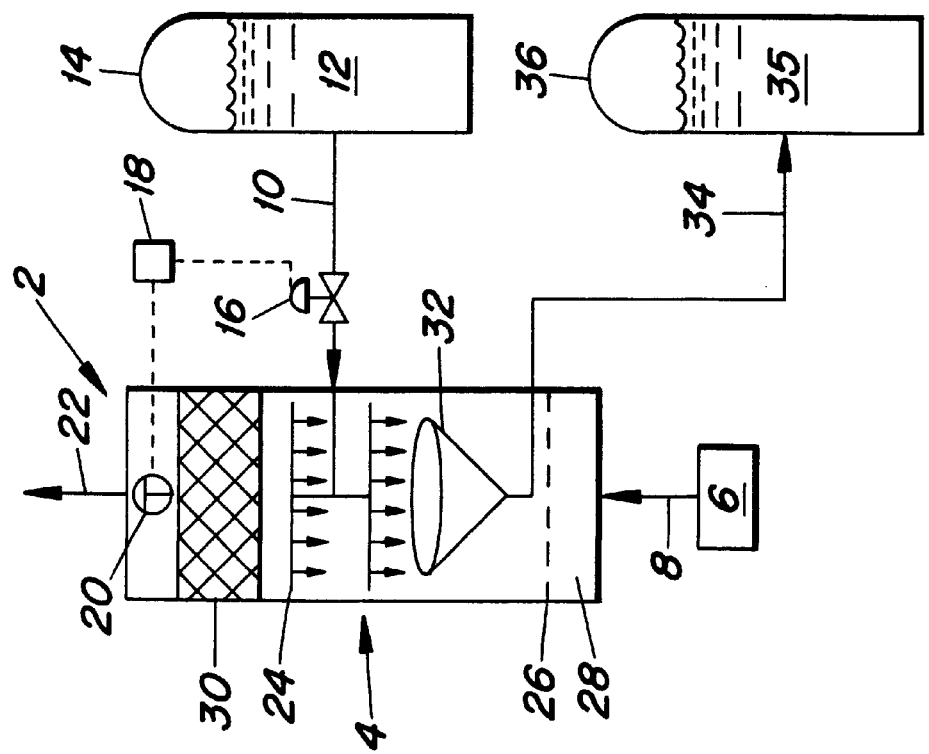

METHOD AND SYSTEM FOR SEPARATION OF A MIXED GAS CONTAINING OXYGEN AND CHLORINE

BACKGROUND OF THE INVENTION

1. Field of the Invention

The present invention relates to a method for separating a mixed gas comprising oxygen and chlorine. The invention also relates to a system for separating a mixed gas comprising oxygen and chlorine. The inventive method and system have particular application in ore processing, for example, in the treatment of an exhaust gas from an iron chloride oxidation reactor.

2. Description of the Related Art

In iron ore processing, iron chlorides are oxygenated during roasting, in the presence of excess oxygen, yielding iron oxides, chlorine and oxygen, as well as byproducts of the reaction. The chlorine and oxygen are generally in the form of a mixed gas.

Attempts have been made to recycle the chlorine gas removed from the oxidation reactor to the ore processing reactor as part of an impure stream of byproducts including various gases. It has also been proposed to remove a relatively pure product stream of chlorine gas from the mixed gas effluent, while recycling the remainder of the effluent to the processing reactor.

To the present inventor's knowledge, however, there has been no attempt to recapture both the excess oxygen from oxidation of the iron chlorides and the chlorine thus produced as relatively pure product streams. In particular, there has not heretofore been a technique of separating a mixed gas containing oxygen and chlorine by cryogenic processing.

In developing the present invention, the inventor considered various processes, which, for one reason or another, were deemed not optimal for accomplishing the separation of oxygen and chlorine from a mixed gas. For example, an effluent gas containing chlorine and oxygen may be separated into its components by passing it through a suitable membrane. However, there are several problems with this method. Membrane separation of chlorine and oxygen is typically poor because the permeation characteristics of oxygen and chlorine are often very similar. Further, even if a good separation could be achieved, chlorine can be highly corrosive to separation membranes, which are generally amide-based polymers containing chlorine in the polymer backbone. Therefore, relatively small amounts of chlorine would be expected to destroy the membrane, leading to high maintenance and material costs. In addition, as membrane-based gas separation processes are driven by partial pressure differentials, relatively high feed pressures are required to effect separation. Compression of the feed gas to nominally 100 to 150 psig would be relatively costly even if the separation technology was feasible.

Another possible separation technique is a solvent-based separation using a solvent, such as water or titanium tetrachloride ($TiCl_4$), which can selectively absorb chlorine without absorbing much of the oxygen. However, $TiCl_4$ represents an environmental hazard and cannot easily be disposed of after use. Further, like any solvent-based separation system, it is difficult to separate the desired product, whether oxygen or chlorine, from the solvent used to absorb that product.

The inventor has further considered the use of pressure swing adsorption for separation of a mixed gas containing oxygen and chlorine. For such a system to work, it would first be necessary to develop a suitable dry bed particle adsorbent system which could adsorb the chlorine while allowing oxygen to pass through without hindrance. One of the silica or molecular sieve products currently in use for oxygen separation may be useful. However, it is unknown how the silica or molecular sieve products would react to chlorine or how effective the oxygen/chlorine separation process would be. Apparently, extensive product research would be required to develop such a system.

Although use of both the solvent-based separation and pressure swing adsorption systems is thought to be possible, both systems require extensive capital and labor costs for development and execution. For the foregoing reasons, therefore, membrane, solvent-based and pressure swing separation techniques are not currently desirable for the separation of oxygen and chlorine from a mixed gas.

Therefore, it is an object of the present invention to provide a novel method and system for separating a mixed gas comprising oxygen and chlorine into an oxygen-enriched gas fraction and a chlorine-rich liquid fraction. The method and system are designed to meet the requirements of the ore processing industry and to overcome the disadvantages and difficulties associated with the related art.

The inventive method makes possible effective separation of oxygen from chlorine in a mixed gas in an economical manner, since both the oxygen-enriched gas fraction and the chlorine-rich liquid fraction which are produced can be recycled for use in various applications. For example, where the mixed gas is an effluent from an ore processing plant, the oxygen-enriched gas fraction can be recycled back to an oxidation reactor, while the chlorine-rich liquid fraction can be used elsewhere in the ore treatment process. Alternatively, either fraction can be stored for later use in the same or other processes.

It is a further object of the present invention to provide a novel system for separating a mixed gas comprising oxygen and chlorine, wherein the system can be used to practice the inventive method.

Other objects and advantages of the present invention will become apparent to one of ordinary skill in the art upon review of the specification, drawings, and claims appended hereto.

SUMMARY OF THE INVENTION

The foregoing objectives are met by the method and system of the present invention. According to a first aspect of the present invention, a novel method for separating a mixed gas comprising oxygen and chlorine is provided. The method comprises: a) introducing the mixed gas and a refrigerant into a separator unit; and b) condensing at least a portion of the chlorine from the mixed gas in the separator unit, thereby forming a condensed chlorine-rich liquid fraction and an oxygen-enriched gas fraction. The condensing duty is supplied by the refrigerant.

According to a further aspect of the invention, a system for separating a mixed gas comprising oxygen and chlorine is provided. The system comprises: a separator unit and a mixed gas source, wherein the separator unit is connected to receive the mixed gas; a refrigerant source for supplying condensing duty to condense chlorine from the mixed gas, wherein the separator unit is connected to receive the refrigerant; a conduit for removing a chlorine-rich liquid fraction from the separator unit; and a conduit for removing an oxygen-enriched gas fraction from the separator unit.

The method and system in accordance with the invention allow for the production of an oxygen-enriched gas fraction which typically contains about 80 vol% or greater oxygen, preferably about 85 vol% or greater, and more preferably about 90 vol% or greater. In an ore processing plant, this substantially enriched oxygen stream may be recycled, or forwarded for use in another system, such as an air separation system.

The method and system of the invention also produce a chlorine-rich liquid fraction. The chlorine-rich liquid fraction may be recycled to an ore processing plant, for example, to an ore chlorination process, or can be stored for later use in other applications. The chlorine-rich liquid fraction typically contains about 95 vol% or greater chlorine, preferably about 99 vol% or greater.

By providing enriched oxygen and chlorine products, the methods and systems of the invention allow for the recycling of chlorine and oxygen. This can reduce the overall cost of the process producing the mixed gas, such as an ore processing system, by providing an efficient and cost effective means to use otherwise wasted end products.

BRIEF DESCRIPTION OF THE DRAWINGS

The objects and advantages of the invention will become apparent from the following detailed description of the preferred embodiments thereof in connection with the accompanying drawings, in which like reference numerals designate like elements, and in which:

FIG. 1A illustrates a general process flow for separating a mixed gas containing oxygen and chlorine via direct injection of refrigerant in accordance with one aspect of the invention;

FIG. 1B illustrates an alternative separator unit structure based on indirect injection of refrigerant which can be used in the process flow of FIG. 1A;

DETAILED DESCRIPTION OF THE PREFERRED EMBODIMENTS OF THE INVENTION

Figure 2:
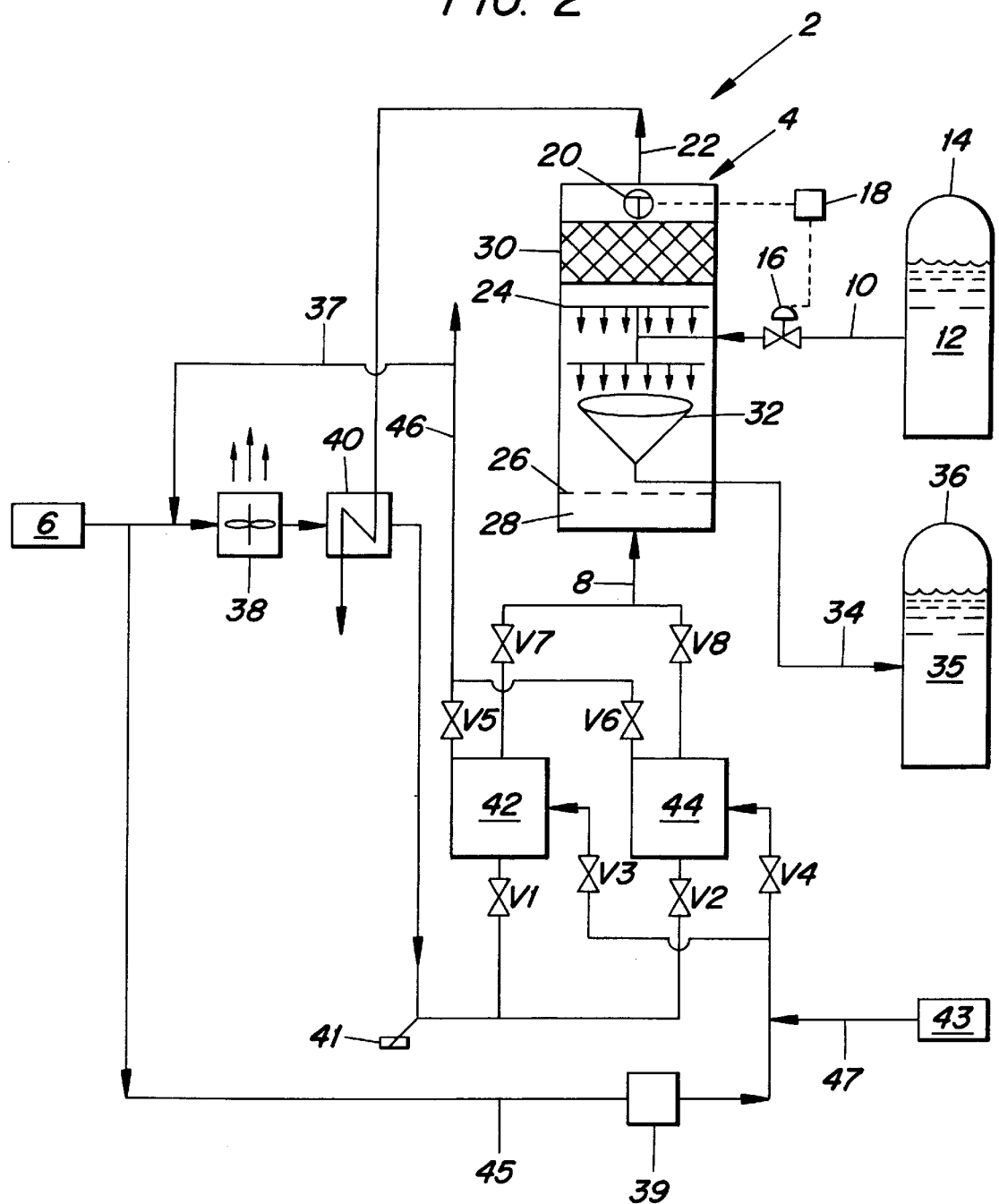
FIG. 2 is a process flow diagram for separating a mixed gas of oxygen and chlorine according to a further aspect of the invention.

Oxygen and chlorine gas, present in a mixed gas stream, for example, in an effluent gas stream from an iron chloride ($FeCl_3$) oxidation reactor in an iron ore processing plant, can be recovered and purified in an economical and effective manner. In the mixed gas separation methods and systems according to the invention, a mixed gas comprising oxygen and chlorine can be separated, resulting in enriched product streams of an oxygen-enriched gas fraction and a chlorine-rich liquid fraction.

According to a preferred method of the invention, the end products can include a chlorine-rich liquid fraction having a chlorine purity of about 95 vol% or greater, and an oxygen-rich gas fraction having an oxygen purity of about 70 vol% or greater, preferably about 85 vol% or greater, and more preferably about 90 vol% or greater.

The method and system of the invention will now be described generally with reference to the figures, which illustrate process flows according to various aspects of the invention.

While not being limited in any way thereto, FIG. 1A illustrates an exemplary oxygen/chlorine separation system 2 as envisioned by this invention. Prior to discussing the structure of the oxygen/chlorine separation system 2, a brief discussion of the process that takes place therein is in order.

As described above, an object of the invention is to separate chlorine from oxygen wherein both are contained in a mixed gas. The invention takes advantage of the difference in boiling points of chlorine and oxygen, which at one atmosphere are −34.6° C. and −183° C., respectively. The boiling point difference allows for separation of the chlorine and oxygen by cooling the mixed gas to a temperature at which the chlorine condenses to a liquid and the oxygen remains in a gaseous state.

Because of the temperatures involved in the process, it is preferable that the separator unit 4, wherein the chlorine is condensed out of the mixed gas, be vacuum jacketed or insulated to minimize inefficiencies due to heat transfer between the system and the surrounding environment.

The separator unit 4 is connected to a mixed gas source 6 by conduit 8. The mixed gas contains chlorine and oxygen, the source of which can be, for example, an effluent gas from a chlorinated ore (e.g., titanium tetrachloride ($TiCl_4$), vanadium dichloride ($VCl_2$), ferrous chloride ($FeCl_2$), or ferric chloride ($FeCl_3$)) oxidation, or roasting, process in an ore treatment plant.

Also connected to separator unit 4 is a refrigerant conduit 10 for introducing a refrigerant from a refrigerant source 12 into the separator unit 4. The refrigerant is contained in a suitable refrigerant vessel 14, which is either vacuum jacketed or insulated with appropriate temperature control (not shown) for maintaining the fluid at a desired temperature.

The refrigerant can be any fluid which has the ability to condense the chlorine in the gas mixture without significant condensation of the oxygen, and preferably without causing any oxygen condensation. Because chlorine has a boiling point of −34.6° C., suitable refrigerants include fluids having a lower boiling point, such as liquid oxygen (b.p. −183° C.), liquid argon (b.p. −185.7° C.), or liquid nitrogen (b.p. −195.8° C.), carbon dioxide, and mechanical refrigerants, such as various FREONS. This will ensure that the chlorine in the mixed gas condenses while the oxygen remains in gaseous state. The refrigerant preferably has characteristics that produce a temperature of from about −60 to −180° C., preferably from about −90 to −120° C. in the mixed gas stream. of the suitable refrigerants, liquid oxygen is particularly preferred. This is so because oxygen will not contaminate the product streams if it is used as a direct contact refrigerant, since oxygen is itself a desired product. Quite the contrary, a liquid oxygen refrigerant will enhance the purity of the oxygen-enriched gas fraction. Since oxygen is consumed in the ore roasting process, a double benefit can be derived by employing oxygen as a refrigerant in the separation process; once as a refrigerant and later as a reactant as it is recycled back to the oxidation reactor. Indirect contact between the mixed gas and refrigerant by means of a closed loop-type system can also be used, wherein FREONS, oxygen, or other cryogenic fluids, such as nitrogen, carbon dioxide, etc., can be used as the refrigerant.

A control valve 16 is disposed in conduit 10 for regulating the flow rate of the refrigerant into separator unit 4. Flow control of the refrigerant can be automated with a controller 18, based on the output of temperature sensor 20 at or near the oxygen-enriched gas fraction outlet 22 of the separator unit. Suitable control means are known in the art, and include, for example, one or more programmable logic controllers (PLC's) or microprocessors.

The refrigerant may be introduced to separator unit 4 in a variety of ways so as to allow indirect or direct contact with the mixed gas. Indirect contact between the mixed gas and refrigerant can be accomplished by, for example, supplying the refrigerant to the separator unit in a cooling coil 23 (see FIG. 1B) or in some other mechanical construction, such as plates or fins, thereby providing a cold surface for the mixed gas to strike and condense out of the mixed gas. This is also useful for the refrigerants described above, such as liquid nitrogen, liquid argon, FREON-based mechanical refrigerant schemes and carbon dioxide-based refrigerants. With indirect contact, there is no concern that the spent refrigerant gas will pollute the oxygen-enriched gas fraction as there is no direct contact between the two fluids.

Alternatively, the mixed gas may be brought into direct contact with the refrigerant. The refrigerant can be introduced into the separator unit 4, for example, from a sparger 24 containing a plurality of refrigerant outlets or nozzles for emitting liquid streams of the refrigerant. As illustrated in FIG. 1A, the liquid refrigerant contacts the mixed gas directly in the separator unit 4 and, through thermal exchange therewith, causes condensation of the chlorine in the mixed gas. Conversely, contact with the warmer mixed gas will cause vaporization of the liquid refrigerant, which will then mix with the non-condensed portion of the mixed gas, resulting in an oxygen-enriched gas fraction which includes at least a portion of the refrigerant.

Direct contact of the refrigerant with the mixed gas is particularly preferred as it provides more intimate contact between the mixed gas and refrigerant. This provides more efficient cooling of the mixed gas, resulting in a larger amount of chlorine being condensed and, thus, more efficient separation of the oxygen from the chlorine. As previously described, liquid oxygen is particularly useful for direct contact refrigeration, since oxygen can be utilized as both a refrigerant and a reactant in the ore roasting process.

If a refrigerant other than oxygen is brought into direct contact with the mixed gas, further separation of the oxygen-enriched gas fraction to improve the purity of the oxygen-enriched product may be desired. This may be accomplished by a performing a second separation using a separation unit such as described above, or by other suitable separation methods known to those of ordinary skill in the art.

If there is insufficient cooling capacity for the oxygen-enriched gas fraction in a single cooling stage, whether by direct or indirect cooling, one or more additional direct or indirect cooling stages as described above may be employed to provide supplemental cooling in controlled quantities. This additional heat transfer equipment can be supplied by FREONS or cryogens as the cooling agent.

In order to improve the efficiency of contact between the mixed gas and refrigerant, a gas distribution grid 26 and/or a gas plenum 28 are preferably employed in separator unit 4 where the mixed gas enters through conduit 8. The gas distribution grid and/or plenum can provide homogeneous distribution of the mixed gas stream throughout the separator unit 4, improving contact between the mixed gas and refrigerant. In this manner, a more efficient process results, enabling a more enriched oxygen-enriched gas fraction and chlorine-rich liquid fraction to form.

It is desirable that the plenum and/or distribution grid be located at or near the bottom of the separator unit 4, and that the mixed gas likewise enter at or near the bottom of the separator unit. Generally, it is preferred that the mixed gas enter in the bottom third of the separator unit 4, preferably from the bottom center, although it may enter at the sides or off center thereof.

After condensing out the chlorine-rich liquid fraction by contact with the refrigerant, the oxygen-enriched gas mixture rises through the separator unit 4 to the top thereof, and is removed from the separator unit through oxygen-containing gas outlet conduit 22.

To ensure single phase gas flow and further separation of the liquid phase from the gas phase, it is preferable that the oxygen-containing fraction passes through a de-mister 30, before exiting the separator unit. The de-mister 30 will remove any remaining liquid droplets entrained in the separation gas, using a crimped wire mesh of 0.011 inch diameter wire with a large (e.g., greater than 97%) voidage. Greater than 99% of aerosols of 10 m or larger can be captured. The liquid droplets collect in the de-mister 30 and eventually fall to the bottom of the separator unit, where they are collected with the remainder of the condensate.

To assist in the collection of condensate in the separator unit, it is preferred that the chlorine-rich liquid falls into a collector 32. Collector 32 is preferably funnel shaped, and is connected to condensate removal conduit 34 for removal from the separator unit. Alternatively, the bottom of the separator unit may itself act as a collector, feeding conduit 34. The chlorine-rich liquid fraction 35 removed from separator unit 4 through conduit 34 can be stored in a suitable storage vessel 36, or forwarded to another process for use.

The oxygen-enriched gas fraction removed from the separator unit 4 through conduit 22 may be forwarded to another separation unit for further processing, or to another process. In the case of ore processing, the oxygen-enriched gas fraction can be directly recycled to the chlorinated ore oxidation reactor, or recycled after further treatment.

Figure 3:
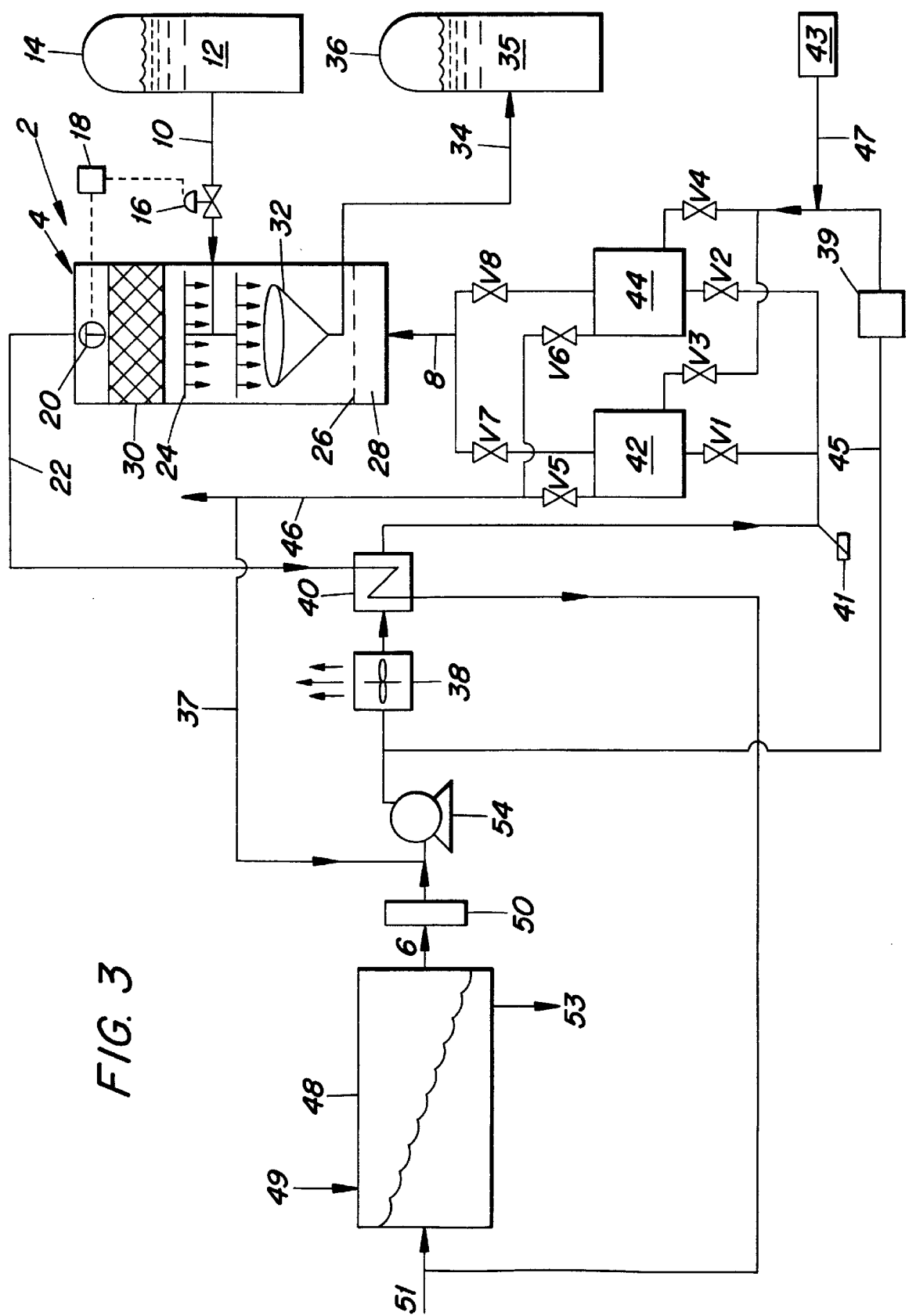
FIG. 3 is a process flow diagram for a preferred embodiment of the invention, wherein a mixed effluent gas containing oxygen and chlorine from an ore treatment process is separated.

The above description relates to the basic method and system for separating a mixed gas into an oxygen-enriched gas fraction and a chlorine-rich gas fraction. As shown in FIGS. 2 and 3, additional steps and components can optionally be employed in the processing of the mixed gas.

For example, FIG. 2 illustrates a further aspect of the invention, wherein the mixed gas can be cooled and/or dried prior to entry into the separator unit 4. Because of the extremely low temperatures involved, it is preferred that the mixed gas enter the separator unit at a relatively cool temperature. Furthermore, it is preferred that the mixed gas be relatively dry in order to prevent freezing of water vapor or carbon dioxide in the separator.

For reasons of process efficiency, it is desirable to pre-cool the mixed gas before it enters the separator unit 4 with the cold oxygen-enriched stream. This can be done before or after drying the mixed gas by passing the mixed gas through one or more heat exchangers. A temperature of from about −20 to 50° C., preferably from about −10 to 10° C., for the cooled mixed gas prior to introduction into the separator unit 4 is typically desired.

Depending upon the initial temperature of the mixed gas, an air/gas heat exchanger 38, a gas/gas heat exchanger 40, and/or other types of heat exchangers known in the art may be used. Air/gas heat exchanger 38 is useful to provide gross cooling from very high temperatures to about ambient temperatures. In such heat exchange, the mixed gas is cooled by heat exchange with air forced over the mixed gas conduit, for example, by a fan.

In the gas/gas heat exchanger 40, the mixed gas is cooled by heat exchange with a heat transfer gas, which is typically at a temperature of from about −180 to −60° C., preferably from −120 to −90° C. Suitable heat transfer fluids are known to those skilled in the art and include an exiting process gas or, for example, halocarbons such as FREONS (e.g., FREON 22) or vaporized cryogens, such as liquid nitrogen and carbon dioxide.

According to a particularly preferred aspect of the invention, the oxygen-enriched gas fraction removed from the separator unit 4 through conduit 22 can be used as the heat transfer fluid in gas/gas heat exchanger 40. The oxygen-enriched gas fraction is typically at a temperature of from about −180 to −60° C., preferably about −120 to −90° C. This process efficiency enhancer provides both cooling of the mixed gas prior to introduction into the separator unit 4, as well as preheating of the oxygen-enriched gas fraction before it is used in another process.

The cooled gas is next passed through one or more dryer beds 42,44 to dry the mixed gas prior to introduction into the separator unit 4. The dryer beds are preferably constructed of silica or other suitable materials known in the art.

The mixed gas is passed over the one or more dryer beds 42,44, thereby reducing the moisture content of the mixed gas to less than about 1 ppm by volume, and the $CO_2$ content to less than about 0.1 ppm by volume. The reduction of moisture in the mixed gas is particularly desirable to prevent blockage within the separator unit 4 due to freezing of such moisture, and the formation of ice crystals therein.

It is preferable that a plurality of dryer beds be provided in parallel, thereby allowing the inactive dryer bed(s) to be regenerated while the active bed(s) are in operation.

Regeneration can be accomplished by purging the inactive dryer beds 42,44 with a dried and/or heated regeneration gas, for example, dry and/or heated nitrogen or air. Flow of the mixed gas to the bed which is to be regenerated is first shut off, and a regeneration gas is next allowed to pass through the bed. Suitable regeneration methods are known to persons skilled in the art.

According to a preferred aspect of the invention, the mixed gas can be employed as the regeneration gas. In such a case, at least a portion of the mixed gas, prior to its being cooled, can be directed to the dryer bed through conduit 45. The mixed gas is removed from the dryer bed(s) 42,44 through conduit 46. This is particularly suitable when the pre-cooled mixed gas is at an elevated temperature. Conduit 45 optionally can include a heater 39 for heating the regeneration gas prior to its introduction into dryer beds 42,44. Where the mixed gas is used as a regeneration gas, the regeneration effluent can be recycled to the process through conduit 37 after passing through the dryer beds, for example, to a point upstream of heat exchangers 38,40.

In an alternative embodiment, a regeneration gas conduit 47 connected to a regeneration gas source 43 independent of the above-described components can be employed.

Control of the regeneration gas and mixed gas flow through the beds can be accomplished by proper manipulation of valves V1–V8, which can be automated by the use of a controller. Suitable control means are described above with reference to the refrigerant flow controller.

Since cooling of the mixed gas will typically condense water vapor and other components from the mixed gas, it is desirable to provide a drain 41 downstream of the heat exchangers 38,40 and upstream of the point of introduction of the mixed gas into the dryer bed system. In this manner, the lifetime of the dryer bed system can be significantly lengthened, and the moisture content of the mixed gas system entering the separator unit 4 can be minimized, effectively preventing the formation of ice crystals which could lead to blockage of flow.

With reference to FIG. 3, the inventive methods and systems are particularly useful for the treatment of an effluent gas from a chlorinated iron oxidation reactor 48. The description of the features previously set forth with reference to FIGS. 1 and 2 is equally applicable to FIG. 3. The chlorinated iron 49 is a typical product of an iron ore chlorination reaction, which is then contacted with oxygen gas 51 in an oxidation reactor, to form an iron oxide 53 and a mixed gas stream 6, as described above.

The mixed gas effluent from the oxidation reactor 48 preferably passes through a filter 50 to remove relatively large particles therefrom. It is preferred that the filter 50 be a low pressure drop, bag house type filter, or the like, with a filter size of from about 10 to 50 micrometers, preferably from about 15 to 35 micrometers.

Because the effluent mixed gas from the oxidation reactor is at a relatively low pressure, for example, less than about 50 psig, preferably about 3 to 15 psig, the pressure of the mixed gas is preferably increased to a pressure up to about 50 psig, more preferably about 3 to 15 psig, to effect flow through the remainder of the system. For example, a blower or compressor 54 may be located before or, preferably, after the filter 50. Although a compressor may obtain a higher pressure, it also requires higher capital and operating costs. Therefore, a blower is preferred.

As the effluent mixed gas from the oxidation reactor 48 is typically at a temperature of approximately 205° C., it is preferably first cooled by the one or more heat exchangers 38, 40, described above, to a temperature of from about −20 to 50° C., preferably from about −10 to 10° C. For example, the air/gas heat exchanger 38 can cool the mixed gas to a temperature of from about 38 to 60° C., while the gas/gas heat exchanger 40 can further cool the mixed gas to a temperature of from about −20 to 10° C., although other cooling schemes are envisioned.

The cooled mixed gas can next be dried as described above with reference to FIG. 2. The dried gas is then passed into the separator unit 4 to produce a chlorine-rich liquid fraction and an oxygen-enriched gas fraction. The chlorine-rich liquid fraction produced by this separation may be reused in the process of ore processing, while the oxygen-enriched gas can be recycled for use in the oxidation reactor 48.

As illustrated, at least a portion of the regeneration effluent removed from the dryer bed system can be recycled to the mixed gas stream via conduit 37, preferably at a point downstream from the filter 50 and on the suction side of blower or compressor. Alternatively, an independent regeneration gas source 43 can be employed for providing the regeneration gas, as previously described.

While the invention has been described in detail with reference to specific embodiments thereof, it will be apparent to those skilled in the art that various changes and modifications can be made, and equivalents employed, without departing from the scope of the appended claims.

What is claimed is:

1. A method for separating a mixed gas comprising oxygen and chlorine, said method comprising:

a) introducing the mixed gas and a refrigerant into a separator unit; and b) condensing at least a portion of the chlorine from the mixed gas in the separator unit, thereby forming a condensed chlorine-rich liquid fraction and an oxygen-enriched gas fraction, wherein the condensing duty is supplied by the refrigerant.

2. The method of claim 1, wherein the separation process temperature is from about −180 to −60° C.

3. The method of claim 1, wherein the refrigerant is selected from the group consisting of liquid oxygen, liquid nitrogen, liquid argon, carbon dioxide and a FREON.

4. The method of claim 3, wherein the condensing at least a portion of the chlorine in the separator unit comprises contacting the mixed gas directly with the refrigerant.

5. The method of claim 4, wherein the refrigerant is liquid oxygen.

6. The method of claim 4, wherein the refrigerant and the mixed gas contact each other countercurrently.

7. The method of claim 1, wherein the mixed gas is separated in the separator unit by directly contacting the mixed gas with the refrigerant followed by indirect contact with a second refrigerant.

8. The method of claim 1, wherein the refrigerant is brought into indirect contact with the mixed gas.

9. The method of claim 8, wherein the refrigerant is selected from the group consisting of liquid oxygen, liquid nitrogen, liquid argon, carbon dioxide and a FREON.

10. The method of claim 7, wherein the first and second refrigerants are the same.

11. The method of claim 1, further comprising drying the mixed gas before introducing it into the separator unit by passing said mixed gas through a dryer bed.

12. The method of claim 11, wherein the step of drying the mixed gas comprises passing said mixed gas through a plurality of dryer beds.

13. The method of claim 1, further comprising pre-cooling the mixed gas before introducing it into the separator unit.

14. The method of claim 13, wherein the pre-cooled mixed gas has a temperature of from about −20 to 10° C.

15. The method of claim 1, wherein the mixed gas is an effluent gas from an ore roasting process.

16. The method of claim 15, further comprising recycling the oxygen-enriched gas fraction to the ore roasting process.

17. The method of claim 1, wherein the mixed gas is separated in the separator unit by indirectly contacting the mixed gas with the refrigerant followed by direct contact with a second refrigerant.

18. The method of claim 17, wherein the first and second refrigerants are the same.

19. A system for separating a mixed gas comprising oxygen and chlorine, said system comprising:
   a separator unit;
   a mixed gas source, wherein the separator unit is connected to receive the mixed gas;
   a refrigerant source for supplying condensing duty to condense chlorine from the mixed gas, wherein the separator unit is connected to receive the refrigerant;
   a conduit for removing a chlorine-rich liquid fraction from the separator unit, and a conduit for removing an oxygen-enriched gas fraction from the separator unit.

20. The system of claim 19, wherein the separator unit comprises means for directly contacting the refrigerant with the mixed gas.

21. The system of claim 20, further comprising a sparger in the separator unit, wherein the sparger is connected to receive the refrigerant from the refrigerant source for release into the separator unit.

22. The system of claim 19, wherein the refrigerant is selected from the group consisting of liquid oxygen, liquid nitrogen, liquid argon, carbon dioxide and a FREON.

23. The system of claim 22, wherein the refrigerant is liquid oxygen.

24. The system of claim 19, wherein the separator unit comprises means for indirectly contacting the refrigerant with the mixed gas.

25. The system of claim 24, wherein the indirect contacting means comprises a cooling coil in the separator unit, wherein the cooling coil is connected to receive the refrigerant from the refrigerant source.

26. The system of claim 25, wherein the refrigerant is selected from the group consisting of liquid oxygen, liquid nitrogen, liquid argon, carbon dioxide and a FREON.

27. The system of claim 19, wherein the separator unit comprises means for directly contacting the refrigerant with the mixed gas, and means for indirectly contacting a second refrigerant with gas from the direct contacting means.

28. The system of claim 27, wherein the first and second refrigerants are the same.

29. The system of claim 19, further comprising a collector for collecting the chlorine-rich liquid fraction in the separator unit, wherein the collector is connected to the conduit for removing the chlorine-rich liquid fraction.

30. The system of claim 19, further comprising one or more dryer beds between the mixed gas source and the separator unit.

31. The system of claim 19, wherein the separator unit comprises means for indirectly contacting the refrigerant with the mixed gas, and means for directly contacting a second refrigerant with gas from the indirect contacting means.

32. The system of claim 31, wherein the first and second refrigerants are the same.

* * * * *